(12) United States Patent
Tsukada et al.

(10) Patent No.: US 6,755,084 B2
(45) Date of Patent: Jun. 29, 2004

(54) PRESSURE SENSOR AND METHOD OF MANUFACTURING PRESSURE SENSOR

(75) Inventors: Masao Tsukada, Atsugi (JP); Koichi Kusuyama, Atsugi (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 0 days.

(21) Appl. No.: 10/426,863

(22) Filed: May 1, 2003

(65) Prior Publication Data

US 2003/0209079 A1 Nov. 13, 2003

(30) Foreign Application Priority Data

May 13, 2002 (JP) ........................................ 2002-137211

(51) Int. Cl.[7] ............................................... G01L 9/08
(52) U.S. Cl. .............................. 73/724; 73/754; 73/727; 73/724; 257/419
(58) Field of Search .......................... 73/754, 700, 721, 73/727, 724; 257/419

(56) References Cited

FOREIGN PATENT DOCUMENTS

JP          11-118642 A        4/1999

*Primary Examiner*—Edward Lefkowitz
*Assistant Examiner*—Andre Allen
(74) *Attorney, Agent, or Firm*—Sughrue Mion, PLLC

(57) ABSTRACT

In a pressure sensor in which a frame shaped protruding potion is formed on a surface side of a substrate by means of an etching process, and a blocking plate is connected to an upper part of the protruding portion, to form a standard pressure chamber, a recess is formed on at least one of the substrate and the blocking plate that constitute the standard pressure chamber, to increase the height of the standard pressure chamber, thereby preventing the lowering of pressure detection accuracy due to foreign substances within the standard pressure chamber.

25 Claims, 4 Drawing Sheets

PRESSURE SENSOR AND METHOD OF MANUFACTURING PRESSURE SENSOR

FIELD OF THE INVENTION

The present invention relates to a pressure sensor that detects deflection of a thin portion of a substrate, to detect a pressure of fluid, and a method of manufacturing the same.

RELATED ART OF THE INVENTION

Heretofore, there has been known a pressure sensor as disclosed in Japanese Unexamined Patent Publication No. 11-118642, as a pressure sensor that detects deflection of a thin portion of a substrate, to detect a pressure of fluid.

Such a pressure sensor consists of a substrate, a blocking plate and a piezoresistive element.

A pressure receiving recess is formed on a rear face of the substrate, to thereby form a thin portion on a surface side of the substrate.

A frame shaped protruding portion is formed on a surface side of the thin portion of the substrate by means of an etching process of an insulating film, and the blocking plate is laid on the protruding portion, to thereby form a standard pressure chamber.

Further, the piezoresistive element that detects deflection of the thin portion is disposed on the surface side of the thin potion that is surrounded by the frame shaped protruding portion.

Then, the deflection of the thin portion caused according to a difference between a pressure of fluid introduced into the pressure receiving recess, and a pressure in the standard pressure chamber, is detected by the piezoresistive element.

However, in the pressure sensor described above, when the frame shaped protruding portion is formed on the substrate, sometimes particles of the insulating film or resist are adhered to a part surrounded by the protruding portion.

Since the protruding portion is formed by means of the etching process of the insulating film as described above, it can protrude only by about 1 μm from the surface of the substrate.

Contrary to the above, there may be the case where particles of the insulating film or resist are higher than the height of the protruding portion.

Therefore, the particles of the insulating film or resist are trapped between the blocking plate and the thin portion of the substrate, to prevent the deflection of the thin portion. Thus, pressure detection accuracy is lowered.

Here, if it is investigated whether or not the particles of the insulating film or resist are adhered to the part surrounded by the protruding portion and, in the case where the particles are adhered, an operation for removing the particles is performed, it is possible to prevent the lowering of detection accuracy. However, there is caused a problem in that working manpower is increased, resulting in an increase of manufacturing cost.

SUMMARY OF THE INVENTION

Therefore, an object of the present invention is to provide a pressure sensor capable of detecting a pressure with high accuracy, even in the case where particles of an insulating film or resist are adhered to a part surrounded by a frame shaped protruding portion.

In order to achieve the above object, the present invention is constituted so that a recess for increasing the height of space surrounded by the frame shaped protruding portion is formed on at least one of a surface of a thin portion surrounded by the frame shaped protruding portion and a rear face of a blocking plate.

Other objects and features of this invention will become understood from the following description with reference to the accompanying drawings.

PREFERRED EMBODIMENTS

Figure 1:
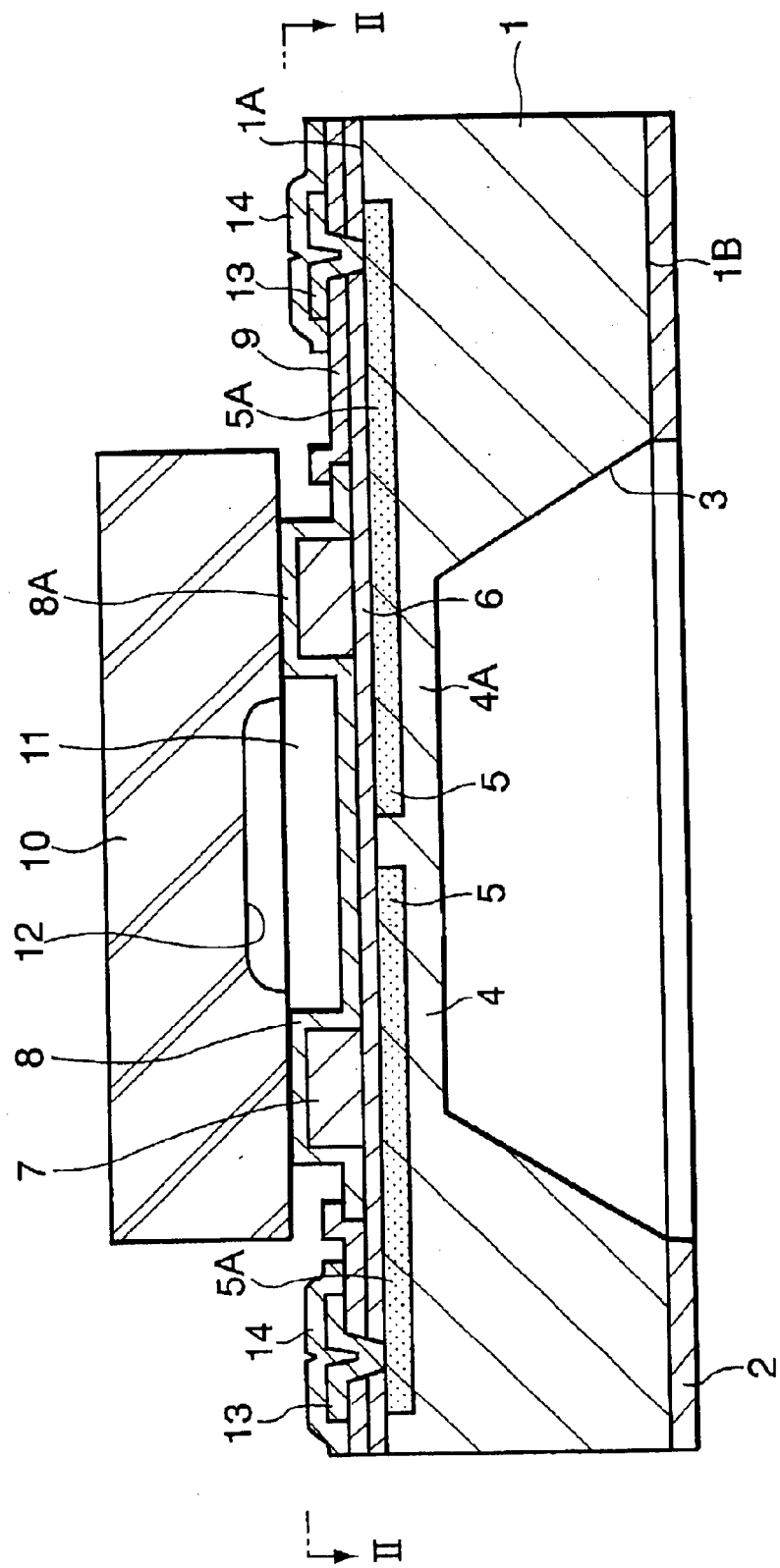
FIG. 1 is a cross-sectional view showing an embodiment of a pressure sensor according to the present invention.

FIG. 1 is a cross-sectional view of a pressure sensor.

In FIG. 1, a substrate 1 is an N-type silicon substrate including impurity ions, such as phosphorus, arsenic or the like.

A pressure receiving recess 3 is formed on a rear face 1B side of substrate 1, by performing an anisotropic etching process using an insulating film 2 of silicon oxide as a mask, so that a bottom wall of recess 3 constitutes a thin portion 4.

A frame shaped protruding portion 7 is formed on a surface 1A of substrate 1 so as to be aligned with thin portion 4, so that a part of thin portion 4, surrounded by protruding portion 7, serves as a diaphragm portion 4A that is deflected according to a pressure.

Piezoresistive elements 5 are disposed in the vicinity of four sides of diaphragm portion 4A.

Each piezoresistive element 5 is formed as a P-type semiconductor by implanting impurity ion, such as boron ions or the like, in surface 1A side of substrate 1.

Figure 2:
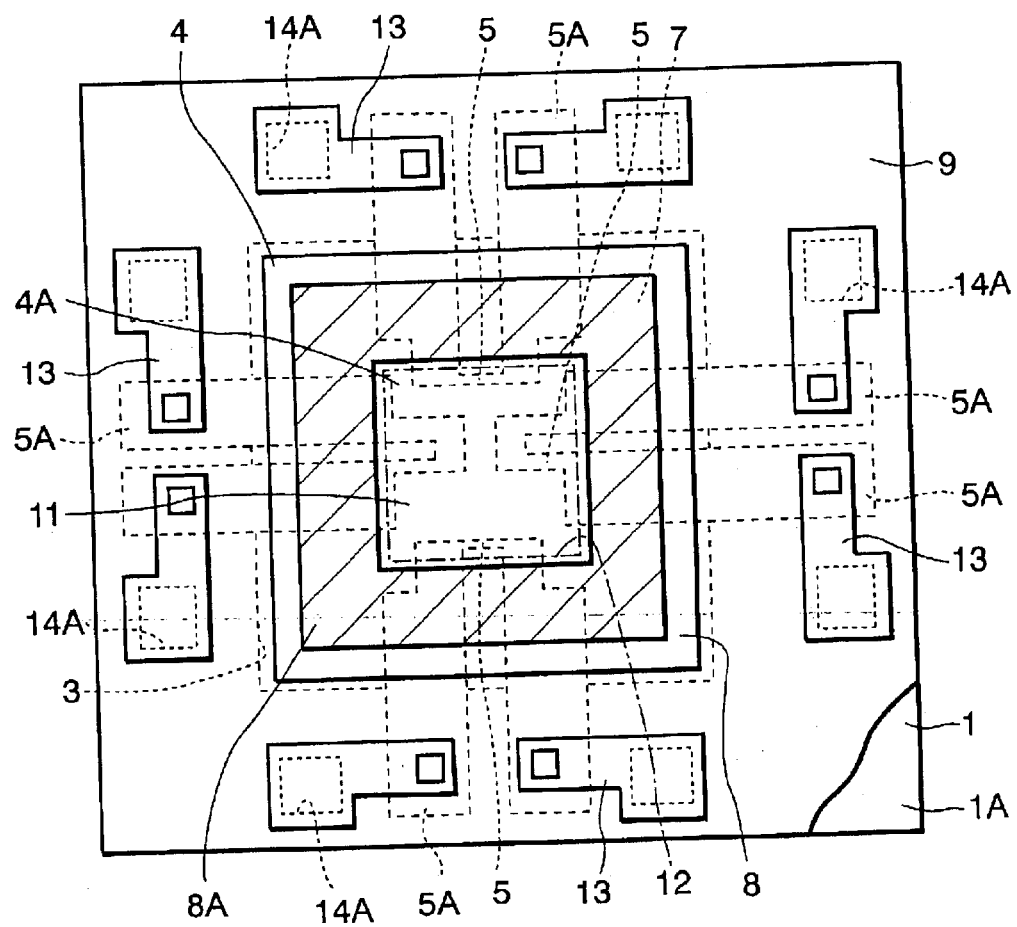
FIG. 2 is a sectional view showing the pressure sensor viewed from II—II direction in FIG. 1.

Further, simultaneously with forming piezoresistive element 5, wiring portions 5A, 5A each having the width wider than that of piezoresistive element 5 and having a resistance smaller than that of piezoresistive element 5, are formed on surface 1A side of substrate 1 by the ion implantation (refer to FIG. 2).

Each wiring portion 5A is connected with opposite end sides of each piezoresistive element 5, and also extends to the outside of diaphragm portion 4A.

Each piezoresistive element 5 is deflected together with diaphragm portion 4A, and a resistance thereof is changed according to a deflection amount thereof.

Moreover, an insulating film 6 formed of silicon oxide, silicon nitride or the like, is disposed on surface 1A of substrate 1, so that each piezoresistive element 5 and each wiring portion 5A are coated by insulating film 6.

Frame shaped protruding portion 7 is formed on insulating film 6 so as to protrude from insulating film 6, to surround a center part of thin portion 4 in substrate 1 and each piezoresistive element 5. This center part of thin portion 4, surrounded by protruding portion 7, serves as diaphragm portion 4A.

Further, after forming insulating film 6 by depositing an insulating material, such as silicon oxide, silicon nitride or the like, on surface 1A of substrate 1, protruding portion 7 is formed by performing an etching process, to protrude from insulating film 6 by about 1 µm.

Then, protruding portion 7 is formed with, on an inside thereof, an approximate square opening having a length L1 in each side.

Furthermore, a central site including protruding portion 7 of surface 1A of substrate 1 is deposited by a connecting film 8 formed of a polycrystalline silicon material or the like.

A site 8A of connecting film 8, that coats an end face of protruding portion 7, constitute a part of protruding portion 7.

A blocking plate 10 is connected to site 8A of connecting film 8 by means of anoxic bonding or the like.

Moreover, an inter-layer insulating film 9 formed of an insulating material is disposed on an outer periphery side of connecting film 8, to coat a circumference of surface 1A of substrate 1 except for protruding portion 7 and the inside thereof.

Blocking plate 10 is formed of a glass material, and connected to site 8A of connecting film 8 to form a standard pressure chamber 11 surrounded by protruding portion 7, between thereof and diaphragm portion 4A.

The inside of standard pressure chamber 11 is set to be in a vacuum condition, for example.

A recess 12 is formed on a rear face side of blocking plate 10, which constitutes standard pressure chamber 11.

Recess 12 is formed so as to have the depth of about 1 to 10 µm, using an etching process, a blasting process or the like.

Here, a size L0 of a distance between a bottom face of recess 12 of blocking plate 10 and connecting film 8 on the side of diaphragm portion 4A (refer to FIG. 3), is set so that a rear face of blocking plate 10 contacts with a surface of diaphragm portion 4A when a deflection amount of diaphragm portion 4A reaches a predetermined amount smaller than a deflection limit at which diaphragm portion 4A is broken.

Figure 3:
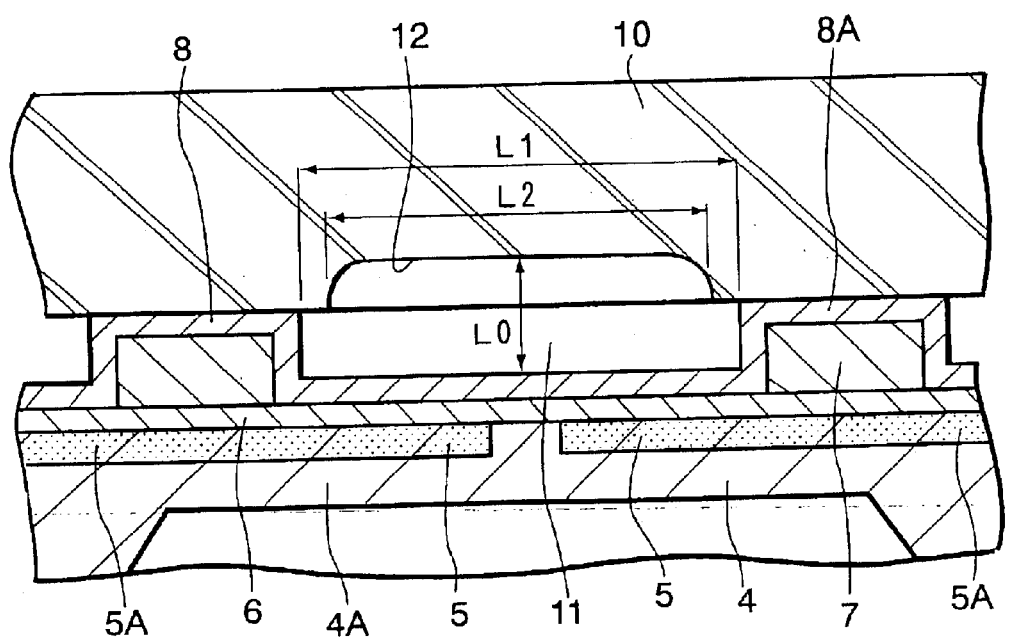
FIG. 3 is a main part enlarged sectional view showing a thin portion of the pressure sensor in FIG. 1.

Further, recess 12 includes an opening of approximately square shape with each side having a size L2 shorter than a size L1 of protruding portion 7 as shown in FIG. 3, and an opening area of recess 12 is set to be narrower than an area inside of protruding portion 7.

A plurality of wiring patterns 13 formed of metal materials such as aluminum or the like, is disposed on inter-layer insulating film 9.

Wiring patterns 13 are coated with an insulating type protective film 14, and also, each of one ends thereof passes through inter-layer insulating film 9 and insulating film 6, to be connected to each of wiring portions 5A of piezoresistive elements 5, while each of the other ends thereof being connected to an external signal processing circuit (not shown in the figure) through an opening portion 14A of protective film 14.

The pressure sensor according to the present invention includes such a constitution as described above. Next, an operation of the pressure sensor will be described below.

If a pressure is applied on recess 3 of substrate 1, according to a pressure difference between this pressure and a pressure of standard pressure chamber 11, diaphragm portion 4A is deflected together with each piezoresistive element 5, and according to the deflection amount of diaphragm portion 4A, a resistance value of each piezoresistive element 5 is changed.

Accordingly, by detecting the resistance value of each piezoresistive element 5 based on a voltage, a current or the like between respective wiring patterns 13, the pressure acting on diaphragm portion 4A can be detected.

Here, in the present embodiment, since recess 12 is formed on the rear face of blocking plate 10, the height of standard pressure chamber 11, that is, the size L0 of the distance between the rear face of blocking plate 10, and connecting film 8 of diaphragm portion 4A, can be increased by the depth of recess 12.

Therefore, even in the case where particles of insulating film or resist are adhered to the inside of protruding portion 7, it can be avoided that the deflection of diaphragm portion 4A is prevented by the particles.

As a result, even if the particles of insulating film or resist are adhered to the inside of protruding portion 7, diaphragm portion 4A can be deflected according to the pressure, to thereby detect the pressure with high accuracy.

Further, since the opening area of recess 12 formed on the rear face of blocking plate 10 is formed so as to be narrower than the area inside of protruding portion 7, even if blocking plate 10 is slightly displaced from a connection position when blocking plate 10 is connected to protruding portion 7, recess 12 can be arranged inside of protruding portion 7.

Here, if recess 12 is positioned on an upper face of protruding portion 7, since the strength at this position is lowered, not only diaphragm portion 4A but also thin portion 4 outside diaphragm portion 4A is deflected, so that the deflection amount acting on piezoresistive elements 5 is changed, thereby lowering the pressure detection accuracy.

Contrary to the above, in the present embodiment, since recess 12 can be reliably arranged inside of protruding portion 7, it is possible to deflect only diaphragm portion 4A in response to the pressure, thereby enabling to detect the pressure with high accuracy.

Moreover, in the present embodiment, the depth of recess 12 is set, so that diaphragm portion 4A contacts with blocking plate 10 before diaphragm portion 4A is deformed to the deflection limit, to prevent diaphragm portion 4A from being deformed to the deflection limit.

Therefore, it is possible to prevent diaphragm portion 4A from being broken due to deflective deformation, thereby enabling to improve the durability and reliability of the pressure sensor.

In the case where recess 12 and protruding portion 7 can be aligned with each other with high accuracy, areas of the opening of recess 12 and the inside of protruding portion 7 can be set to be in same shape and same size.

Figure 4:
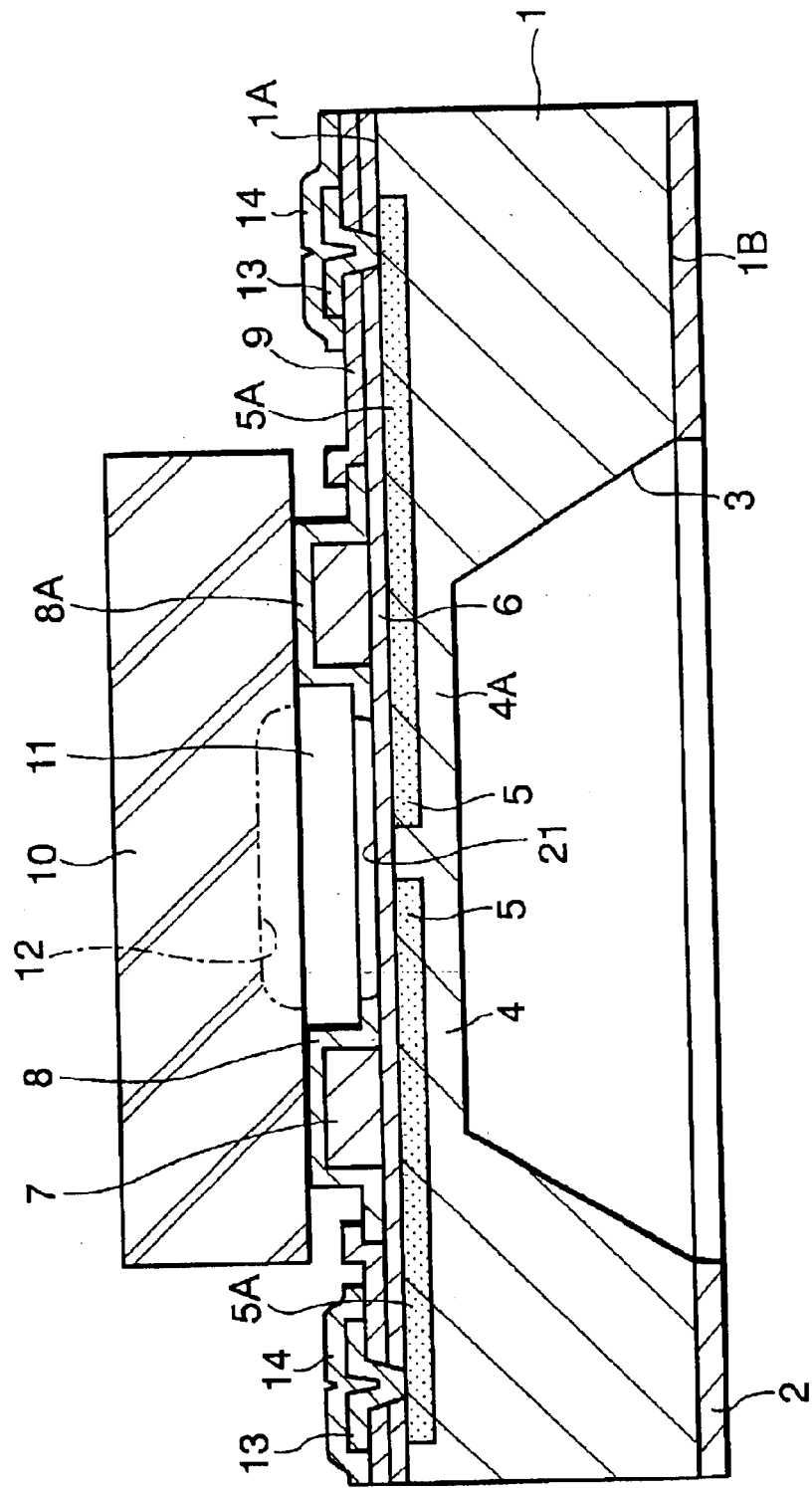
FIG. 4 is a cross-sectional view showing another embodiment of the pressure sensor according to the present invention.

Furthermore, in the above embodiment, although recess 12 has been formed on the rear face of blocking plate 10, as shown in FIG. 4, a recess 21 can be formed on connecting film 8 positioned on the surface side of diaphragm portion 4A, and also, in addition to recess 21, recess 12 can be formed on the rear face side of blocking plate 10.

Still further, in the above embodiment, substrate 1 formed of N-type silicon material, has been used. However, for example, a P-type silicon substrate can be used. Moreover, an SOI (silicon on insulator) substrate in which an oxide film is intervened between two silicon plates can be used.

The entire contents of Japanese Patent Application No. 2002-137211, filed May 13, 2002, a priority of which is claimed, are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed are:

1. A pressure sensor comprising:

a substrate formed of silicon material, in which a pressure receiving flat recess is formed on a rear face thereof to provide a thin portion on a surface side thereof, and also a frame shaped protruding portion is formed on a surface side of said thin portion;

a blocking plate connected to an upper part of the frame shaped protruding portion of said substrate, to block space surrounded by said frame shaped protruding portion; and a deflection detecting element that detects deflection of said thin portion surrounded by said frame shaped protruding portion, wherein a second recess for increasing the height of the space surrounded by said frame shaped protruding portion is formed on a rear face of said blocking plate.

2. A pressure sensor according to claim 1, wherein an opening of said second recess is enclosed in an opening of the space surrounded by said frame shaped protruding portion.

3. A pressure sensor according to claim 1, wherein the depth of said second recess for increasing the height of the space is set, so that the thin portion surrounded by said frame shaped protruding portion contacts with the rear face of said blocking plate when a deflection amount of the thin portion surrounded by said frame shaped protruding portion reaches a predetermined deflection amount smaller than a deflection limit.

4. A pressure sensor according to claim 1, wherein said deflection detecting element is a piezoresistive element.

5. A pressure sensor according to claim 1, wherein said substrate is an SOI (silicon on insulator) substrate in which an oxide film is intervened between two silicon plates.

6. A pressure sensor according to claim 1, wherein said deflection detecting element is arranged on each of four sides of the thin portion surrounded by said frame shaped protruding portion.

7. A pressure sensor according to claim 1, wherein a pressure of the space blocked by said blocking plate is set to be vacuum.

8. A pressure sensor according to claim 1, wherein a wiring pattern is formed on the surface of said substrate outside said frame shaped protruding portion, with one end thereof being connected to said deflection detecting element.

9. A pressure sensor according to claim 1, wherein the depth of said second recess is 1 to 10 $\mu$m.

10. A pressure sensor according to claim 1, wherein said blocking plate is formed of a glass material.

11. A manufacturing method of a pressure sensor, comprising the steps of:

forming a pressure receiving first recess on a rear face of a substrate;

forming a frame shaped protruding portion on a surface side of a thin portion that is provided on said substrate by forming said pressure receiving recess;

forming a deflection detecting element on said thin portion surrounded by said frame shaped protruding portion;

connecting a blocking plate to an upper part of the frame shaped protruding portion; and forming a second recess for increasing the height of space surrounded by said frame shaped protruding portion on a rear face of said blocking plate.

12. A manufacturing method of a pressure sensor according to claim 11, wherein said step of forming said frame shaped protruding portion, comprises forming an insulating film on a surface of said substrate, and performing an etching process, to form said frame shaped protruding portion.

13. A manufacturing method of a pressure sensor according to claim 11, wherein said step of forming said deflection detecting element;

comprises forming said deflection detecting element by implanting impurity ions in the surface side of said substrate.

14. A manufacturing method of a pressure sensor according to claim 11, wherein said step of forming said second recess comprises forming a recess on the rear face of said blocking plate; by means of an etching process.

15. A manufacturing method of a pressure sensor according to claim 11, wherein said step of forming said second recess comprises forming a recess on the rear face of said blocking plate; by means of a blasting process.

16. A manufacturing method of a pressure sensor according to claim 11, wherein said step of forming said first recess;

comprises forming an insulating film on the rear face of said substrate, and performing an anisotropic etching process by using said insulating film as a mask, to form said first recess.

17. A manufacturing method of a pressure sensor according to claim 11, wherein said step of connecting the blocking plate to the upper part of said frame shaped protruding portion;

comprises forming a connecting film for coating at least said frame shaped protruding portion on the surface side of said substrate, to connect said blocking plate to said connecting film.

18. A manufacturing method of a pressure sensor according to claim 11, wherein said step of forming said second recess comprises forming a recess on the rear face of said blocking plate; to a depth of 1 to 10 $\mu$m.

19. A pressure sensor comprising:

a substrate formed of silicon material, in which a pressure receiving first recess is formed on a rear face thereof to provide a thin portion on a surface side thereof, and also a frame shaped protruding portion is formed on a surface side of said thin portion;

a blocking plate connected to an upper part of the frame shaped protruding portion of said substrate, to block space surrounded by said frame shaped protruding portion; and a deflection detecting element that detects deflection of said thin portion surrounded by said frame shaped protruding portion, wherein a second recess for increasing the height of the space surrounded by said frame shaped protruding portion is fanned on at least one of a material disposed on a surface of said thin portion surrounded by said frame shaped protruding portion and a rear face of said blocking plate.

20. A pressure sensor according to claim 19, wherein a said second recess is formed on the rear face of said blocking plate, and an opening of said recess formed on the rear face of said blocking plate is enclosed in an opening of the space surrounded by said frame shaped protruding portion.

21. A pressure sensor according to claim 19, wherein the depth of said second recess for increasing the height of the space is set, so that the thin portion surrounded by said frame shaped protruding portion contacts with the rear face of said blocking plate when a deflection amount of the thin portion surrounded by said frame shaped protruding portion reaches a predetermined deflection amount smaller than a deflection limit.

22. A pressure sensor according to claim 19, wherein said deflection detecting element is a piezoresistive element.

23. A manufacturing method of a pressure sensor, comprising the steps of:

fanning a pressure receiving first recess on a rear face of a substrate;

forming a frame shaped protruding portion on a surface side of a thin portion that is provided on said substrate by forming said pressure receiving recess;

forming a deflection detecting element on said thin portion surrounded by said frame shaped protruding portion;

connecting a blocking plate to an upper part of the frame shaped protruding portion; and forming a second recess for increasing the height of space surrounded by said frame shaped protruding portion on at least one of a material disposed on a surface of said thin portion surrounded by said frame shaped protruding portion and a rear face of said blocking plate.

24. A manufacturing method of a pressure sensor according to claim 23, wherein said step of fanning said frame shaped protruding portion comprises forming an insulating film on a surface of said substrate, and performing an etching process, to form said frame shaped protruding portion.

25. A manufacturing method of a pressure sensor according to claim 23, wherein said step of forming a said second recess comprises fanning a recess on at least one of the material disposed on a surface of said thin portion surrounded by said frame shaped protruding portion and the rear face of said blocking plate to a depth of 1 to 10 $\mu$m.

* * * * *